United States Patent Office
3,458,571
Patented July 29, 1969

3,458,571
FLUOROCARBON POLYAMINES
Emery G. Tokoli, Rochester, N.Y., assignor to Minnesota Mining and Manufacturing Company, St. Paul, Minn., a corporation of Delaware
No Drawing. Continuation-in-part of application Ser. No. 350,553, Mar. 9, 1964. This application Apr. 6, 1967, Ser. No. 628,811
Int. Cl. C07c *103/30, 143/28*
U.S. Cl. 260—556
10 Claims

ABSTRACT OF THE DISCLOSURE

Primary amines are provided having distal perfluoroalkyl groups and an intermediate chain comprising a sulfonamido or carbonamido group with or without one or more aza groups in an alkylene chain. They crosslink polymers and combine with sensitive monomers such as epoxy resins, isocyanates, and the like, to confer oleophobicity on surfaces of metal, glass, wood, textiles, paper, ceramics and other materials.

---

This application is a continuation-in-part of my copending application Ser. No. 350,553, filed Mar. 9, 1964 and now abandoned.

This invention relates to new and valuable distally fluorinated primary amines having chains comprising sulfonamide and carbonamide links.

It is one object of this invention to provide distally perfluoroalkyl substituted primary amines.

Yet another object of this invention is to provide amines possessing both secondary and primary amine groups together with perfluorinated terminal chains.

Still another object of this invention is to provide amphoteric compounds possessing perfluorinated terminal groups.

Additional objects of the invention will become apparent from a reading of the disclosure herein.

In accordance with the above and other objects of the invention distally perfluoroalkyl-substituted amines are provided having the structures

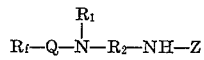

and

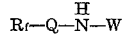

wherein $R_f$ is a perfluoroalkyl group of 1 to 18 carbon atoms, Q is a member of the group —$SO_2$— and —CO—, $R_1$ is saturated lower alkyl of 1 to 6 carbon atoms, $R_2$ is a bridging alkylene group of 2 to 13 carbon atoms, W is a member of the group consisting of amino-alkyl of 2 to 6 carbon atoms, amino-methylbenzyl and aza-substituted amino-alkylene and Z is a member of the group consisting of amino-alkyl of 2 to 6 carbon atoms, amino-biphenyl, amino-methylbenzyl, amino-phenylmethylphenyl, amino-phenoxyphenyl, amino-phenylsulfonylphenyl and aza-substituted omega-amino-alkylene.

The polyamines of the invention are useful for the cross-linking of polymers and for polymerization with reactive monomers such as epoxy resins, isocyanates and the like to confer oleophobicity on surfaces of metal, glass, wood, textiles, paper, ceramics and other materials. They are available by several synthetic routes.

Certain of the novel distally perfluoroalkyl-substituted amines and polyamines of the invention are obtained by the reaction:

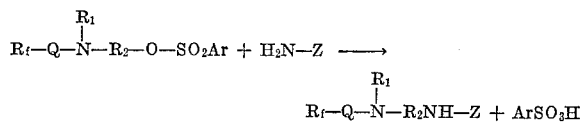

wherein $R_f$, Q, $R_1$, $R_2$ and Z have the above significance and Ar is aryl such as benzene or toluene.

Amines of the general formula $H_2N$—Z which provide compounds of the invention include: ammonia, ethylenediamine, trimethylenediamine, tetramethylenediamine, hexamethylenediamine and the like; m-xylylenediamine and the like; 4,4'-diaminobiphenyl and the like; methylene bis aniline and the like; 4,4'-diaminodiphenyl ether (i.e., oxydianiline) and the like; 4,4'-diaminodiphenylsulfone and the like; and diethylenetriamine, triethylenetetramine, tetraethylenepentamine, pentaethylenehexamine, polyethyleneimine of molecular weight up to about 100,000 corresponding to about 2500 aza groups and the like. It will be seen that polyethyleneimine is an aza-substituted omega aminoalkylene of virtually unlimited size which, moreover, possesses a complex branched structure. Aromatic rings of these compounds may be substituted by noninterfering monovalent groups such as fluorine, chlorine, bromine, nitro, methyl and methoxy. It is generally preferred that aza-substituents be spaced apart by two carbon atoms as such compounds are most readily available and result in omega-aminoalkylene groups NH-interrupted at intervals of two carbon atoms.

Although aminolysis is generally applicable to sulfonate esters of carbinols which are substantially free from active hydrogen atoms to produce the above amines in which $R_1$ is alkyl, the sulfonamido and carbonamido amine compounds in which $R_1$ is hydrogen are found actually to represent a special class which are amphoteric in character as a result of the residual acidity of the amide group and basic as the result of the one or more amino groups. It should be noted that the perfluorinated sulfonic and carboxylic acids are several orders of magnitude stronger acids than the nonfluorinated acids of similar carbon chains. These amides therefore tend to form salts either with arene sulfonic or other acids or with excess base. These salts with acids are found to be generally extremely difficult to manipulate and special synethetic approaches which avoid this difficulty have been found to be more convenient than the aminolysis reaction of arene sulfonate esters.

One method which is empoyed utilizes the reaction of the perfluoroalkanesulfonyl fluoride with an excess of the appropriate anhydrous amine followed by exact neutralization of the liberated hydrogen fluoride (with which the aminosulfonamide also forms a salt) with a solution of an alkali metal base in a miscible nonaqueous solvent such as a lower alkanol, e.g., ethanol, methanol or isopropanol. This reaction is:

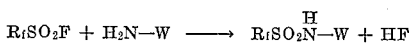

wherein $R_f$ and W have the above significances. The amine may be used in very large excess, or the sulfonyl fluoride may be added slowly to the amine giving effectively a large excess. The precipitate of alkali metal fluoride is separated by filtration and the resulting solution of the amine and more or less of the salt thereof with the excess of base is evaporated. The novel compounds of the formula $R_fSO_2NH$—W are amphoteric and form salts with the base $H_2NW$ of the same hydrocarbon skeleton and also internally, i.e., zwitterions. The zwitterion form of the product can be obtained in crystalline form as described hereinbelow for perfluorooctanesulfonamidoethyl amine. These salts with amine bases and the zwitterion forms are found to possess surfactant properties.

The production of N-hydrogen carbonamido amines is conveniently effected by aminolysis of the carboxylic acid ester with the appropriate polyamine used in excess. The carbonamido amines also form zwitterions.

The invention having been described in general terms as to scope, it is now more particularly illustrated by examples intended to show those skilled in the art how to practice the invention in the best mode presently contemplated. It will be understood that in these examples parts are by weight where not otherwise specified and temperatures are in degrees centigrade.

EXAMPLE 1

Sulfonate esters which are used as intermediates in the preparation of monoamines and polyamines possessing distal perbuoroalkane - carbonamido and -sulfonamido groups are prepared from the carbinol and arene sulfonyl halide.

To a solution of 571 parts (1.0 mole) of N-ethyl-N-β-hydroxyethyl-perfluorooctanesulfonamide in 400 parts by volume of acetone are added 110 parts (1.1 moles) of triethylamine followed by the addition over 0.5 hour, with constant stirring and maintaining the temperature at about 23° to 27° C., of 177 parts (1.0 mole) of benzenesulfonyl chloride. Stirring is continued for a further hour at 25° C. and an aliquot is titrated using N/10 hydrochloric acid and methyl orange. The titration shows the consumption of 1 mole of base and therefore completion of the esterification recation.

The reaction mixture is diluted with 900 parts by volume of methylene chloride and washed four times with portions of water at 15° C. The heavy organic layer is dried over anhydrous sodium sulfate and evaporated at temperatures below 50° C. using progressively increasing vacuum. The crude waxy ester may be employed directly for most reactions or washed with methanol (with some losses) to give a crystalline product which is essentially pure and suitable for any further reactions.

The above procedure is repeated employing the carbinols shown below with the same and other arene sulfonyl chlorides to produce the arene sulfonate esters indicated in the table.

| Structure of carbinol | Structure of arene sulfonate ester |
|---|---|
| $C_4F_9SO_2N(C_2H_5)$—$CH_2CH_2OH$ | $C_4F_9SO_2N(C_2H_5)$—$CH_2CH_2$—O—$SO_2$—$C_6H_4Cl$ |
| $C_8F_{17}SO_2N(CH_3)$—$(CH_2)_{11}OH$ | $C_8F_{17}SO_2N(CH_3)$—$(CH_2)_{11}OSO_2$$C_6H_4CH_3$ |
| $C_8F_{17}SO_2N(C_2H_5)$—$(CH_2)_4OH$ | $C_8F_{17}SO_2N(CH_3)$—$(CH_2)_4OSO_2$$C_6H_4OCH_3$ |
| $C_8F_{17}SO_2N(C_2H_5)$—$CH_2$—CH$CH(CH_3)$—OH. | $C_8F_{17}SO_2N(C_2H_5)$—$CH_2$—CH$(CH_3)$—$OSO_2C_6H_5$ |
| $C_{12}F_{25}SO_2N(C_4H_9)$—$CH_2CH_2OH$ | $C_{12}F_{25}SO_2N(C_4H_9)$—$CH_2CH_2$—O—$SO_2C_6H_4NO_2$ |
| $C_4F_9SO_2N(C_3H_7)$—$CH_2CH_2OH$ | $C_4F_9SO_2N(C_3H_7)$—$CH_2CH_2$—O—$SO_2C_6H_4Br$ |
| $C_7F_{15}CON(CH_3)$—$CH_2CH_2OH$ | $C_7F_{15}CON(CH_3)$—$CH_2CH_2$—O—$SO_2C_6H_5$ |

The above sulfonate esters are used to provide amines of the invention, both primary mono amines and polyamines having both primary and secondary amine groups.

EXAMPLE 2

A shaking autoclave adapted to withstand pressures to 2000 p.s.i. and fitted with rupture disc is charged with 207 parts (0.284 mole) of N-ethyl perfluorooctanesulfonamidoethyl benzenesulfonate of Example 1, 300 parts by volume of absolute ethanol and 80 parts (4.7 moles) of liquid ammonia and then closed. The temperature is raised while shaking to 120° to 125° C. and maintained for six hours. The autoclave is then cooled and vented. The reaction mixture is worked up by adding an ethanolic solution of 0.284 mole of potassium hydroxide and, after stirring for about 10 minutes, the precipitate of potassium benzenesulfonate is collected and the filtrate and washes evaporated under reduced pressure. The crude oily product is taken up in absolute ether (400 parts by volume) and the solution filtered. N-ethyl-N-β-aminoethylperfluorooctanesulfonamide is obtained as an oil, boiling at 104° C. at 0.17 mm. Hg pressure, by evaporation of the ether. It is converted to the hydrochloride by passing hydrogen chloride gas into the dry ethereal solution.

EXAMPLE 3

A mixture of 355 parts (0.5 mole) of the N-ethyl perfluorooctanesulfonamidoethyl benzenesulfonate of Example 1 and 150 parts (2.5 moles) of 98 percent ethylenediamine is heated under nitrogen with stirring to 90° C. An exothermic reaction starts and the temperature rises to 110° C. External heating is discontinued for about 15 minutes and then resumed and the reaction mixture is heated at 125° C. for 4.5 hours. The mixture separates into two liquid phases.

Ethylenediamine is stripped under about 20 mm. Hg pressure and a solution of 32 parts of potassium hydroxide in 250 parts by volume of ethanol is added to the residue followed by 250 parts by volume of xylene to increase the precipitation of potassium benzenesulfonate. The precipitate is collected and washed with the same solvent combination. The combined filtrate and washes are consentrated under reduced pressure to give an oily product which is taken up in 250 parts by volume of ether, filtered and again concentrated. The brownish orange colored oil is N-ethyl N-perfluorooctanesulfonyl diethylenetriamine $$C_8F_{17}SO_2N(C_2H_5)-C_2H_4-NH-C_2H_4-NH_2$$

The neutralization equivalent calculated is 306, found 363 indicating the presence of the N,N'-bis(sulfonamidoalkyl)diamine:

$$(C_8F_{17}SO_2N(C_2H_5)C_2H_4-NH-CH_2)_2$$

The above procedure is repeated employing other alkylene diamines in correspondingly large excesses over stoichiometric to provide other sulfonyl amines.

| Diamine | Product amine |
|---|---|
| $H_2N(CH_2)_6NH_2$ | $C_8F_{17}SO_2N(C_2H_5)$—$CH_2CH_2$—NH—$(CH_2)_6$$NH_2$. |
| $H_2N(CH_2)_4NH_2$ | $C_8H_{17}SO_2N(C_2H_5)$—$CH_2CH_2$—NH—$(CH_2)_4$$NH_2$. |
| $H_2N(CH_2)_3NH_2$ | $C_8F_{17}SO_2N(C_2H_5)$—$CH_2CH_2$—NH—$(CH_2)_3$$NH_2$. |

The distinction between the monoamines (as prepared in Example 2) and the novel polyamines of the invention as prepared above is illustrated by saturating swatches of synthetic fabrics, e.g., nylon and the polyester sold under the tradename Dacron, with solutions of 1 g. of the respective amines $C_8F_{17}SO_2N(C_2H_5)-C_2H_4NH_2$ and $$C_8F_{17}SO_2N(C_2H_5)-C_2H_4-NH-C_2H_4NH_2$$

each in 40 ml. of acetone followed by drying in air and then heating for 40 minutes at 250° F. Each swatch shows substantial oil repellency to mixtures of castor oil with toluene and heptane, the polyamine-treated swatches repelling mixtures of lower castor oil content. After 3 launderings using detergent the polyamine-treated swatches still retain substantial oil repellency although the monoamine-treated swatches no longer repel mixtures containing less than 90 percent castor oil for the 15 second times employed as criteria. In this test, higher content of toluene and heptane (equivolume mixture) shows better oil repellency.

EXAMPLE 4

Essentially the procedure of Example 3 is repeated employing 127 parts (0.179 mole) of the same benzenesulfonate ester and 93 parts (0.9 mole) of diethylenetriamine and heating with stirring at 150° C. for 3 hours under nitrogen. A solution of 1.35 parts (0.18 mole) of potassium hydroxide in 180 parts by volume of ethanol is added to the residue after stripping excess triamine and the precipitate of potassium benzenesulfonate is collected and washed with ethanol. The yellowish oily N-ethyl N-perfluorooctanesulfonyl triethylenetetramine:

$$C_8F_{17}SO_2-N(C_2H_5)-(C_2H_4NH)_3H.$$

is obtained as an oil after taking up in ether, filtering and concentrating as above-described. Neutralization equivalent: Calculated 218; found 254. This indicates the presence of bis-(sulfonamidoalkyl)triamine.

Other polyamines, i.e., aza-substituted alkylenes and omega-amino alkylenes, are employed in the above procedure in comparably large excess to give higher members of the series, thus:

| Polyamine employed | Product sulfonyl amine |
|---|---|
| $H_2N(C_2H_4NH)_3H$ | $C_8F_{17}SO_2N(C_2H_5)-(C_2H_4NH)_4H$ |
| $H_2N(C_2H_4NH)_4H$ | $C_8F_{17}SO_2N(C_2H_5)-(C_2H_4NH)_5H$ |

Polyethylenimine is an example of an aza-substituted omega-aminoalkylene amine of great complexity and is available commercially as an aqueous solution. For use in the above reaction (and the reaction of Example 10) in which water is to be avoided, the polyethylenimine is dried and simultaneously placed in solution in toluene by azeotropically removing water and the toluene solution diluted with alcohol is then employed for the reactions. Thus, 400 g. of 50 percent aqueous solution of polyethylenimine and 300 ml. of toluene is distilled with good stirring, collecting water and returning toluene, until 204 ml. of aqueous phase has been collected and a further 115 ml. of toluene is then distilled. The resultant anhydrous solution of polyethylenimine in toluene is homogeneous at elevated temperatures but separates into two liquid phases at room temperature. Homogeneity at room temperatures (which makes manipulation more convenient) is achieved by the addition of 250 ml. of absolute ethanol. This "stock" solution (about 35% by weight) is titrated and suitable aliquots employed.

A solution of 190 g. (about 70 g. polyethylenimine containing about 15 to 20 aza groups per molecule) of stock solution prepared as described above and 71 g. of N-ethyl perfluorooctanesulfonamidoethyl benzenesulfonate is refluxed for 10 hours and is then neutralized with 100 ml. of 1 normal alcoholic potassium hydroxide. The solution is diluted with 300 ml. of toluene and filter-aid added and the solution filtered to remove potassium benzenesulfonate. The filtrate and washes are concentrated to a sticky, stiff, translucent, semisolid residue of N-ethyl perfluorooctanesulfonamidoethyl polyethylenimine.

Other polyethylenimine preparations containing up to about 2500 aza groups react similarly except for the effects of the increasing molecular weight on both the polymer and product.

EXAMPLE 5

Essentially the procedure of Examples 3 and 4 is repeated employing 142 parts (0.2 mole) of the same benzenesulfonate ester of Example 1 and 27.2 parts (0.2 mole) of metaxylylenediamine in 100 parts by volume of absolute ethanol. The mixture is refluxed for seven hours and permitted to cool overnight. The benzenesulfonic acid salt of the amine crystallizes and can be isolated if desired. The free amine is isolated by neutralization with 12.8 parts (0.2 mole) of 85 percent potassium hydroxide in 100 parts by volume of ethanol followed by collection of the precipitated potassium salt and further work up as above to give the oily N-ethyl-N-perfluorooctanesulfonamidoethyl m-xylylenediamine, $$C_8F_{17}SO_2N(C_2H_5)-CH_2CH_2-NHCH_2C_6H_4CH_2NH_2$$

as a semicrystallized oil. Neutralization equivalent: Calculated 344; found 400, indicating as before the presence of some disubstitution. The crude product which is useful for many purposes can be recrystallized from methanol and the recrystallized material melts at about 62° to 65° C.

When this procedure is repeated employing other mononuclear aromatic diamines similar reactions are effected, thus p-phenylenediamine gives $$C_8F_{17}SO_2N(C_2H_5)-C_2H_4-NHC_6H_4NH_2$$

which is a useful intermediate for the formation of compounds containing aromatic groups such as dyestuffs and pharmaceuticals.

EXAMPLE 6

The above procedure of Example 3 using ethylene diamine is repeated employing various sulfonate esters of Example 1 in respective stoichiometric proportions and gives the amines as shown in the following table.

| Sulfonate ester | Product amine |
|---|---|
| $C_4F_9SO_2N(C_2H_5)-CH_2CH_2OSO_2C_6H_4Cl$ | $C_4F_9SO_2N(C_2H_5)-(CH_2CH_2NH)_2H$ |
| $C_8F_{17}SO_2N(CH_3)-(CH_2)_{11}OSO_2C_6H_4CH_3$ | $C_8F_{17}SO_2N(CH_3)-(CH_2)_{11}NHC_2H_4NH_2$ |
| $C_8F_{17}SO_2N(C_2H_5)-(CH_2)_4OSO_2C_6H_4OCH_3$ | $C_8F_{17}SO_2N(C_2H_5)-(CH_2)_4NHC_2H_4NH_2$ |
| $C_8F_{17}SO_2N(C_2H_5)-CH_2CH(CH_3)-OSO_2C_6H_5$ | $C_8F_{17}SO_2N(C_2H_5)-CH_2CH(CH_3)-NHC_2H_4NH_2$ |
| $C_{12}F_{25}SO_2N(C_4H_9)-CH_2CH_2OSO_2C_6H_4NO_2$ | $C_{12}F_{25}SO_2N(C_4H_9)-(CH_2CH_2NH)_2H$ |
| $C_4F_9SO_2N(C_3H_7)-CH_2CH_2OSO_2C_6H_4Br$ | $C_4F_9SO_2N(C_3H_7)-(CH_2CH_2NH)_2H$ |

EXAMPLE 7

The procedure of Example 5, which is particularly adapted to aromatic diamines and other higher melting diamines is repeated employing polynuclear aromatic diamines as shown below in the corresponding molar amounts to provide the amines shown.

| Polynuclear diamine | Product amine |
|---|---|
| $H_2N-C_6H_4-CH_2-C_6H_4-NH_2$ | $C_8F_{17}SO_2N(C_2H_5)-C_2H_4-NH-C_6H_4-CH_2-C_6H_4-NH_2$ |
| $H_2N-C_6H_4-O-C_6H_4-NH_2$ | $C_8F_{17}SO_2N(C_2H_5)-C_2H_4-NH-C_6H_4-O-C_6H_4-NH_2$ |
| $H_2N-C_6H_4-SO_2-C_6H_4-NH_2$ | $C_8F_{17}SO_2N(C_2H_5)-C_2H_4-NH-C_6H_4-SO_2-C_6H_4-NH_2$ |
| $H_2N-C_6H_4-C_6H_4-NH_2$ | $C_8F_{17}SO_2N(C_2H_5)-C_2H_4-NH-C_6H_4-C_6H_4-NH_2$ |

When the above polynuclear diamines substituted in the rings by fluorine, chlorine, bromine, nitro, methyl and methoxy are employed the nuclearly substituted product amines are obtained.

EXAMPLE 8

N-alkyl-perfluorocarbonamidoalkyl amines are produced by reactions as used for the related sulfonamides usually without dilution. N-methyl-perfluoro-capramido-ethyl benzene-sulfonate (49 parts; from Example 1) is added slowly to 41.2 parts of diethylenetriamine. The temperature rises to 55° C. exothermically. The reaction mixture is then heated at 100° C. for 1.5 hours, cooled to 30° and diluted in 400 parts of water. The solution is adjusted to pH of 10 and extracted twice with isopropyl ether then adjusted to pH of 12 and extracted twice with diethyl ether. The combined extracts are dried and evaporated to yield 21 parts of a viscous liquid which slowly solidifies. $n_D^{25}=1.398$. This includes some isomers of the fluorinated chain and some bis sulfonamides which make the product difficult to purify.

The same reaction is carried out using 50 parts of the same sulfonate ester and 54.4 parts of m-xylylene diamine. Before dilution with water, sodium methoxide is added to precipitate sodium benzenesulfonate which is removed. The product is isolated as a yellowish viscous liquid which solidifies slowly $n_D^{25}=1.422$. Titration indicates this product to comprise 92 percent of the mono-substituted amine $$C_7F_{15}CON(CH_3)C_2H_4NHCH_2C_6H_4CH_2NH_2$$

This xylylene diamine derivative is used as a curing agent for epoxy resin. A 33 percent solution of epoxy resin from bisphenol-A have equivalent weight of 1900 is prepared in glycol monomethyl ether acetate and to 30 cc. of this solution are added 0.5 gram of the above perfluorocapramide derivative of m-xylylene diamine which is dissolved. This solution tends to form droplets when coated on a glass slide and the coating is milky after drying. Prolonging the heating (5 minutes or more) gives a solution showing somewhat less tendency to form droplets which dries to a clear coating when cured by heating for a few minutes. The contact angle of hexadecane to the surface is found to be about 63°.

The same results are obtained by using a solution as above but containing 0.36 gram of the perfluorocapramide first above: $C_7F_{15}CON(CH_3)(C_2H_4NH)_3H$. The contact angle of hexadecane against a coated slide using this material is 62°.

EXAMPLE 9

Commercial grade of ethylenediamine (about 98 percent) is dried over sodium ribbon and redistilled. A vessel is charged with 454 parts (7.55 moles) of the redistilled ethylenediamine and flushed with nitrogen. To the charge, while stirring well, 380 parts (0.755 mole) of redistilled perfluorooctanesulfonyl fluoride (boiling at 154° C. at 729 mm. Hg pressure) is added continuously over 45 minutes in small portions to the ethylene diamine maintained at 20–25° C. by intermittent application of an external cooling bath. Stirring is continued for a further 30 minutes and the reaction mixture then stands for 1.5 hours without stirring.

A 1.00 N solution of potassium hydroxide in absolute methanol is prepared and 755 parts by volume of this solution are added to the reaction mixture. The resultant mixture is warmed to 50° C. with stirring for about 10 to 15 minutes and permitted to cool. The precipitate of potassium fluoride is collected by filtration and washed with 200 parts of absolute ethanol.

The filtrate and washes are combined and concentrated under reduced pressure (about 200 mm. of Hg) gradually further reduced to 20 mm. Hg to a very viscous oily residue which is taken up in 1000 parts by volume of amyl alcohol. Distillation of this solution is continued at atmospheric pressure until about 700 parts by volume of distillate has collected and 500 parts by volume of cold toluene are added to the pot residue and this solution cooled to room temperature. The precipitate is collected and washed with cold methanol. The crystalline product is the zwitterion form of perfluorooctanesulfonamidoethyl amine having the structure:

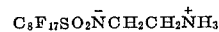

A sample is purified by vacuum sublimation at 170° C. at 1.2 mm. Hg pressure: Neutralization equivalent: Calculated 542; Found as —NH₂, 548 as acid 540. This zwitterion compound melts at 192° to 193° C. The residue from the sublimation melts above 200° C. and is not further investigated. It is considered to be the bis sulfonamide.

When other alkylene diamines are employed in the above procedure the sulfonyl compounds shown below are obtained which can be isolated as the zwitterion forms.

| Alkylene diamine | Sulfonyl amine product |
|---|---|
| H₂NCH₂—CH(CH₃)—NH₂ | C₈F₁₇SO₂NH—CH₂—CH(CH₃)—NH₂ |
| H₂N(CH₂)₆NH₂ | C₈F₁₇SO₂NH(CH₂)₆NH₂ |
| H₂N(CH₂)₄NH₂ | C₈F₁₇SO₂NH(CH₂)₄NH₂ |

EXAMPLE 10

Essentially the procedure of Example 9 above is repeated employing redistilled dried diethylenetriamine (3.72 parts; 3.6 moles) and adding 187 parts (0.36 mole) of redistilled perfluorooctane sulfonyl fluoride over about 1 hour at 15° to 20° C. followed by stirring at room temperature for 1 hour. The hydrogen fluoride in the reaction mixture is neutralized by the addition of the stoichiometric amount (0.36 mole) of sodium hydroxide dissolved in 1050 parts by volume of absolute ethanol. The presence of more than traces of water during the work up of the compounds leads to serious manipulative problems. The fine precipitate of sodium fluoride is collected using a diatomaceous filter aid and washed with ethanol. The filtrate and washes are concentrated as above, taken up in 80 parts by volume of ethanol and diluted with 800 parts by volume of absolute ether. The crystalline material which separates is collected and dried. Titration as base and acid indicates that it contains about 10 percent by weight of unreacted diethylenetriamine. This may also be considered to be the salt formed from 3 moles of sulfonamide to one mole (3 basic nitrogen atoms) of diethylenetriamine.

Other polyamines are employed in the above procedure to give the corresponding sulfonyl polyamines as shown below.

| Polyamine employed | Sulfonyl polyamine product |
|---|---|
| H₂N(C₂H₄NH)₃H | C₈F₁₇SO₂NH(C₂H₄NH)₃H |
| H₂N(C₂H₄NH)₄H | C₈F₁₇SO₂NH(C₂H₄NH)₄H |
| Polyethylenimine | Perfluorooctanesulfonyl polyethylenimine |

The above procedure is repeated employing other sulfonyl fluorides in appropriate stoichiometric excesses of diethylenetriamine. There are thus obtained sulfonyl diethylenetriamines as shown below.

| Sulfonyl fluoride | Sulfonly diethylene triamine |
|---|---|
| C₄F₉SO₂F | C₄F₉SO₂NH(C₂H₄NH)₂H |
| C₆F₁₃SO₂F | C₆F₁₃SO₂NH(C₂H₄NH)₂H |
| C₁₂F₂₅SO₂F | C₁₂F₂₅SO₂NH(C₂H₄NH)₂H |

EXAMPLE 11

Essentially the procedure of Examples 9 and 10 above is carried out employing 272.4 parts (2.0 moles) of meta xylylene diamine (redistilled at 105° C. at 0.25 mm. Hg pressure at about 50° to 60° C. to which 100.4 parts (0.2 mole) of redistilled perfluorooctanesulfonyl fluoride are added over about 45 minutes followed by warming to 80° C. for 15 minutes and neutralization with ethanolic sodium hydroxide as above. After stripping off solvents and most of the excess diamine, a viscous syrupy residue flowing freely at 100° C. is obtained containing about 25 weight percent of meta xylylenediamine. The remainder is the perfluorooctane sulfonamide:

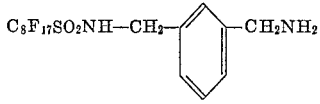

which may be considered to be present as the salt of one mole of sulfonamide to one mole of the diamine.

EXAMPLE 12

To a flask with a stirrer, thermometer, and addition tube are added 90 parts toluene and 51.5 parts diethylene triamine. 42.8 parts of $C_7F_{15}CO_2CH_3$ are added to the stirred solution over a period of 45 minutes, maintaining a temperature of 30° C. After the addition is complete the reaction is warmed to 65° C. The toluene is then removed from the reaction by distillation at reduced pressure. The flask residue is added to 300 parts of 60° C. water with stirring. 45 parts of concentrated HCl are added to bring to pH 10 and the precipitated solids freed from the aqueous phase by decantation. They are washed several times at 65° C. with water at pH 11 and dried. Recovery of $C_7F_{15}CONH(C_2H_4NH)_2H$ is 47 parts; M.P., 58–62° C. Equivalent weight: found 259; calculated 250. This compound is amphoteric and forms a clear solution (zwitterion form) at pH 8 to 9, the acid salt at pH 2 is a gel.

It is used for curing epoxy resins as described in Example 8 above.

I claim:

1. A perfluoroacylamido hydrocarbon amine selected from the group consisting of:

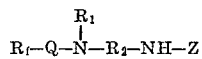

and

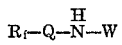

wherein $R_f$ is saturated perfluoroalkyl of 1 to 18 carbon atoms, Q is a divalent group of the group of —$SO_2$— and —CO—, $R_1$ is saturated alkyl of 1 to 6 carbon atoms, $R_2$ is bridging alkylene of 2 to 13 carbon atoms, Z is a member of the group consisting of aminoalkyl of 2 to 6 carbon atoms, aminomethylbenzyl, aminobiphenyl, aminophenymethylphenyl, aminophenoxyphenyl, aminophenylsulfonylphenyl and omega-aminoalkylene up to about 20-fold NH-interrupted at intervals of two carbon atoms and W is a member of the group consisting of aminoalkyl of 2 to 6 carbon atoms and omega-aminoaklylene up to about 20-fold NH-interrupted at intervals of two carbon atoms.

2. A perfluoroalkanesulfonamido hydrocarbon amine according to Claim 1 of the formula:

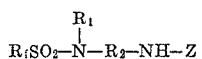

wherein $R_f$ is saturated perfluoralkyl of 1 to 18 carbon atoms, $R_1$ is saturated alkyl of 1 to 6 carbon atoms, $R_2$ is bridging alkylene of 2 to 13 carbon atoms and Z is a member of the group consisting of aminoalkyl of 2 to 6 carbon atoms, aminomethylbenzyl, aminobiphenyl, aminophenymethylphenyl, aminophenoxyphenyl, aminophenylsulfonylphenyl and omega-aminoalkylene up to about 20-fold NH-interrupted at intervals of two carbon atoms.

3. N-ethyl N-perfluorooctanesulfonyl diethylenetriamine of the formula:

$$C_8F_{17}SO_2N(C_2H_5)—(C_2H_4NH)_2H$$

4. N-ethyl N-perfluorooctanesulfonyl triethylenetetramine of the formula:

$$C_8F_{17}SO_2N(C_2H_5)—(C_2H_4NH)_3H$$

5. N - ethyl N - perfluorooctanesulfonamidoethyl beta xylylenediamine of the formula:

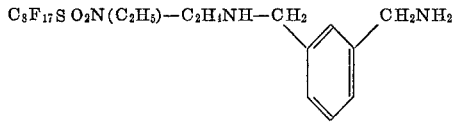

6. N-ethyl-perfluorooctanesulfonamidoethyl polyethylenimine containing about 15 to 20 aza-groups per molecule.

7. A compound of the group consisting of:
(I) perfluoroalkanesulfonamido hydrocarbon amines of the formula:

$$R_fSO_2NHW$$

wherein $R_f$ is saturated perfluoroalkyl of 1 to 18 carbon atoms, and W is a member of the group consisting of aminoalkyl of 2 to 6 carbon atoms, aminomethylbenzyl and omega-aminoalkylene up to about 20-fold NH-interrupted at intervals of two carbon atoms, (II) salts of the sulfonamido group of said perfluoroalkanesulfonamido hydrocarbon amines with the hydrocarbon diamine $H_2NW$ having the same hydrocarbon skeletal structure and (III) internal salts of said perfluoroalkanesulfonamido hydrocarbon amines.

8. The internal salt compound of the formula:

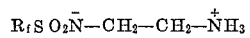

wherein $R_f$ is saturated perfluoroalkyl of 1 to 18 carbon atoms.

9. N-perfluorooctanesulfonyl diethylenetriamine of the formula:

$$C_8F_{17}SO_2NH—(C_2H_4NH)_2H$$

10. N-perfluorooctanesulfonyl meta-xylylenediamine of the formula:

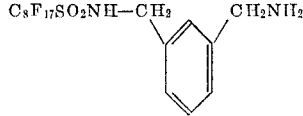

References Cited

UNITED STATES PATENTS

| 2,759,019 | 8/1956 | Brown, et al. | 260—556 |
|---|---|---|---|
| 2,764,603 | 9/1956 | Ahlbrecht | 260—404.5 |

HENRY R. JILES, Primary Examiner

C. M. SHURKO, Assistant Examiner

U.S. Cl. X.R.

106—287;117—161; 260—47, 404.5, 456; 561

PO-1050
(5/69)

UNITED STATES PATENT OFFICE
CERTIFICATE OF CORRECTION

Patent No. 3,458,571      Dated July 29, 1969

Inventor(s)     Emery G. Tokoli

It is certified that error appears in the above-identified patent and that said Letters Patent are hereby corrected as shown below:

Column 3, line 23, "recation" should read --reaction--; line 45, "CH(CH$_3$)-OH" should read --(CH$_3$)-OH--. Column 4, lines 17 and 18, "consentrated" should read --concentrated--; line 66, "1.35" should read --11.35--. Column 10, line 11, "beta" should read --meta--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents